United States Patent [19]

Harker

[11] Patent Number: 5,402,865

[45] Date of Patent: Apr. 4, 1995

[54] AIRCRAFT BRAKE ASSEMBLY RETENTION MECHANISM

[75] Inventor: Brian G. Harker, Granger, Ind.

[73] Assignee: AlliedSignal Inc., Morristown, N.J.

[21] Appl. No.: 86,213

[22] Filed: Jul. 1, 1993

[51] Int. Cl.⁶ .................. F16D 55/36; F16D 55/00
[52] U.S. Cl. .................. 188/71.5; 188/73.32; 301/120
[58] Field of Search ............ 188/71.1, 71.5, 73.1, 188/18 A, 73.31, 73.32, 73.33; 301/6.1, 6.2, 6.7, 119, 120, 121

[56] References Cited

U.S. PATENT DOCUMENTS

| | | | |
|---|---|---|---|
| 353,218 | 11/1886 | Harrington | 301/120 |
| 1,898,313 | 2/1933 | Robbins . | |
| 1,933,176 | 10/1933 | Jonsson | 188/72 |
| 2,097,942 | 11/1937 | Whitney | 188/18 |
| 2,671,532 | 3/1954 | Du Bois | 188/18 |
| 2,683,504 | 7/1954 | Martin | 188/72 |
| 2,823,770 | 2/1958 | Helvern | 188/72 |
| 2,826,274 | 3/1958 | Albright | 188/152 |
| 2,875,855 | 3/1959 | Albright | 188/18 |
| 2,914,140 | 11/1959 | Werner | 188/72 |
| 2,916,105 | 12/1959 | Dasse et al. | 188/72 |
| 3,061,050 | 10/1962 | Van Horn | 188/72 |
| 3,138,406 | 6/1964 | Chamberlain | 301/6.1 |
| 3,164,223 | 1/1965 | Kemp | 188/17 |
| 3,958,833 | 5/1976 | Stanton | 301/6.1 X |
| 4,529,215 | 7/1985 | Strand | 188/67 X |
| 5,107,968 | 4/1992 | Delpassand | 301/6.2 X |

FOREIGN PATENT DOCUMENTS 62-233534 10/1987 Japan .
347685 8/1960 Switzerland .

Primary Examiner—Robert J. Oberleitner
Assistant Examiner—Kevin D. Rutherford
Attorney, Agent, or Firm—Larry J. Palguta; Leo H. McCormick, Jr.

[57] ABSTRACT

The aircraft brake retention mechanism (40) comprises a retractable mechanism (41) having an enlarged circular head (42), and a threaded shaft (43) received threadedly in an end part (50) biased by a resilient mechanism (60). The head (42), shaft (43), end part (50) and resilient mechanism (60) are received within a radial opening (33) of a piston housing (30), with the end part (50) extending through the radial opening (33) and into abutting engagement with a flange (13A) of the axle (13). The piston housing (30) is connected fixedly with a torque tube (20) so that the piston housing (30)/torque tube (20) and associated brake discs (34, 36) are retained axially by the axle flange (13A) which is captured axially between the end part (50) and torque tube (20). The retractable mechanism (41) may be retracted manually and rotated to engage a surface (37A) of the piston housing (30) and be retained in the; retracted position, so that the brake assembly (10) may be disengaged from the axle (13).

18 Claims, 3 Drawing Sheets

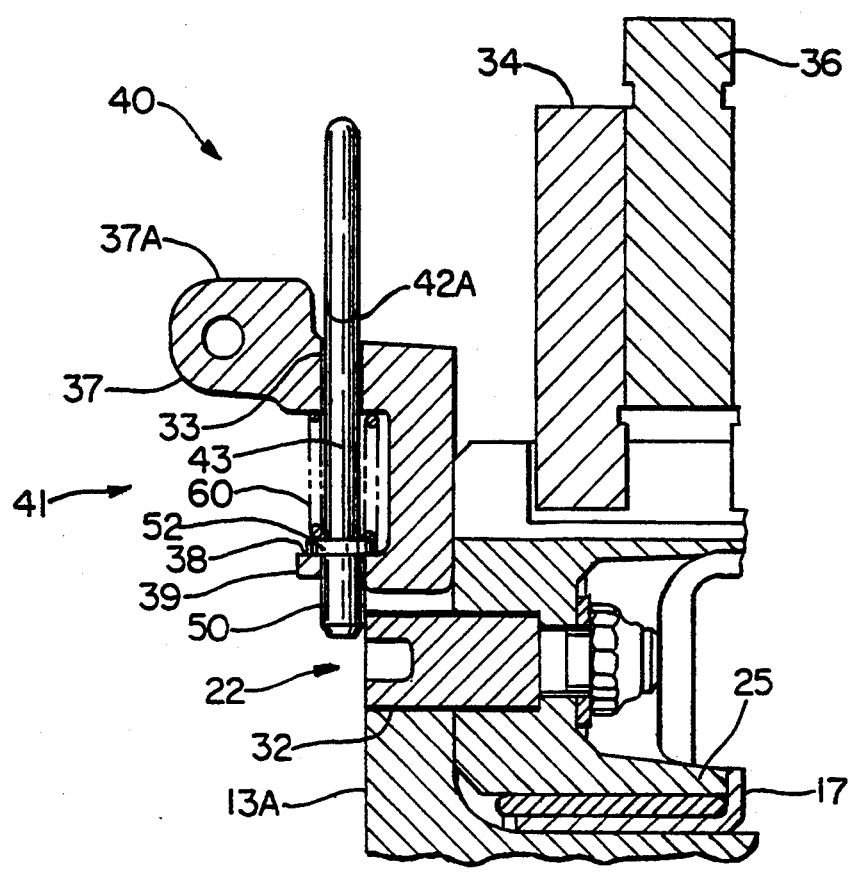
FIG. 3
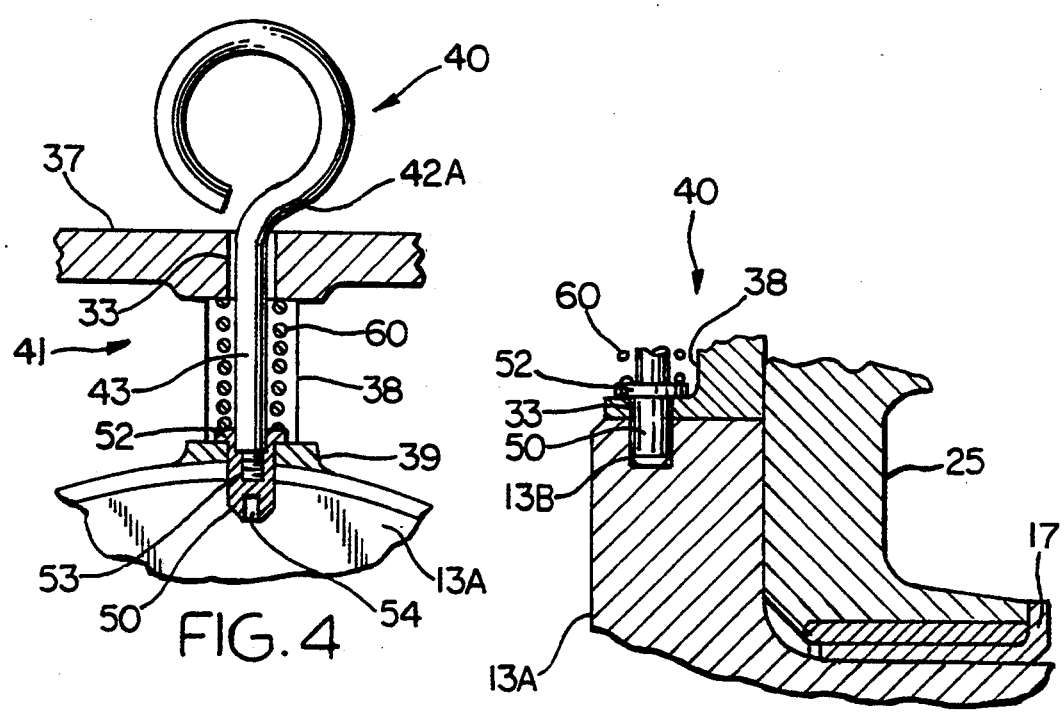
FIG. 4
FIG. 5

AIRCRAFT BRAKE ASSEMBLY RETENTION MECHANISM

The present invention relates generally to an aircraft brake assembly, and in,particular to a retention mechanism for retaining axially the brake assembly on an aircraft axle.

Aircraft brake assemblies comprising a piston housing, torque tube, rotor and stator discs, are generally attached to an axle flange by means of a plurality of bolts and nuts extending between the torque tube and axle flange. The piston housing and torque tube are typically connected together by a plurality of bolts. Should the connection between the torque tube and axle flange comprise integral key member extensions or bolted on key members received within complementary shaped slots in the torque tube or axle flange as disclosed in copending U.S. application Ser. No. 08/086,214, entitled "Aircraft Brake Torque Transfer Assembly", it is necessary to provide a mechanism for retaining the brake assembly axially in place when the aircraft wheel is removed. Although the integral key member extensions or bolted on key members prevent rotation of the brake assembly relative to the axle, and the axle nut, bearings, and wheel are utilized to retain the torque tube axially in place, it is important that the brake assembly be retained axially in place when the wheel is removed. This will prevent accidents that could occur if the brake assembly were permitted to slide off the axle with the wheel. It is highly desirable that the brake assembly retention mechanism be operated easily and quickly by manual means, and be maintainable in an inoperative position so that the brake assembly can be removed easily from the axle.

The present invention provides solutions to the above by providing a brake assembly retention mechanism, comprising an axle which includes an abutment surface, a brake assembly mounted upon the axle and comprising a torque tube connected with a piston housing, at least one stator connected with the torque tube, and at least one rotor for connection with a wheel, and the piston housing including a retractable mechanism extending into abutting engagement with the abutment surface of the axle in order to retain the brake assembly axially in place upon the axle.

The invention is described in detail with reference to the drawings which illustrated:

FIG. 3 is a partial section view taken along view line 3-3 of FIG. 2;

FIG. 4 is an enlarged partial end section view of the brake assembly wheel retention mechanism of the present invention; and FIG. 5 is an enlarged partial reaction view of an alternative structure for effecting the abutting engagement of the present invention.

Figure 1:
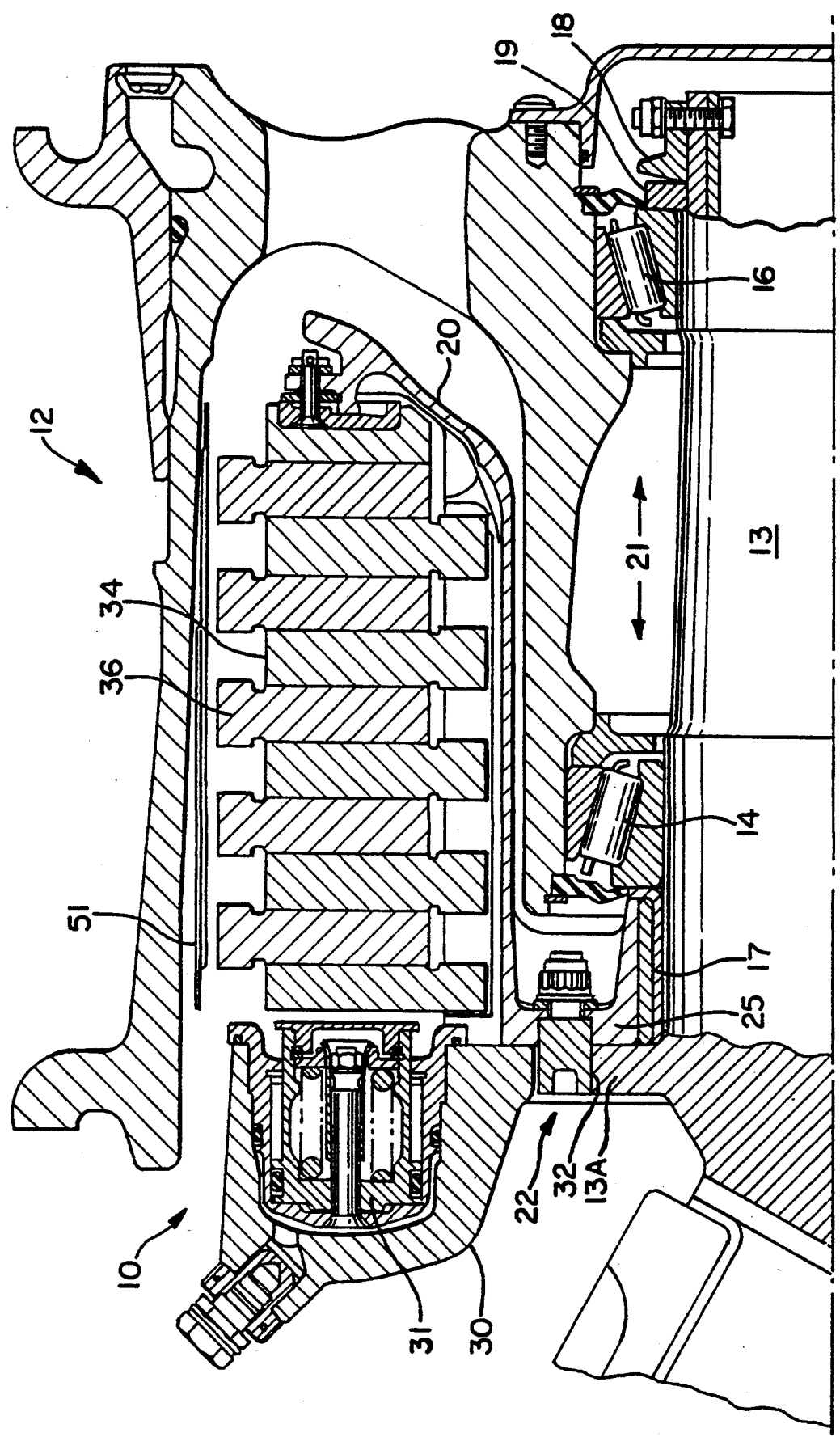
FIG. 1 is a section view of an aircraft brake assembly, wheel and axle including the present invention.

FIG. 1 illustrates in section view an aircraft brake assembly and wheel each designated generally by reference numerals 10 and 12. Wheel 12 is received on stationary portion or axle 13 by means of roller bearing assemblies 14 and 16, with the inner cone of bearing 14 retaining operatively in place torque tube 20 by abutting bushing assembly 17. Axle nut assembly 18 (which includes washer 19) retains bearing assemblies 14, 16, bushing assembly 17 (assemblies 14, 16 and 17 comprising bearing means 21), wheel 12, and torque itube 20 axially in place so that torque tube foot 25 abuts against axle flange 13A. Torque tube 20 includes a plurality of bolted on key member axial extensions 22 (see also FIG. 2) received within complementary shaped axle flange openings 32 to prevent rotation of the torque tube relative to axle 13. Torque tube 20 is connected by a plurality of bolts 24 (see FIG. 2) to piston housing 30 which includes a plurality of pistons 31 for compressing the brake stack comprising stators 34 and rotors 36. Stators 34 are connected by a spline connection with torque tube 20, while the rotors are connected by a similar spline connection with not shown drive keys attached or integral with the wheel 12.

Figure 2:
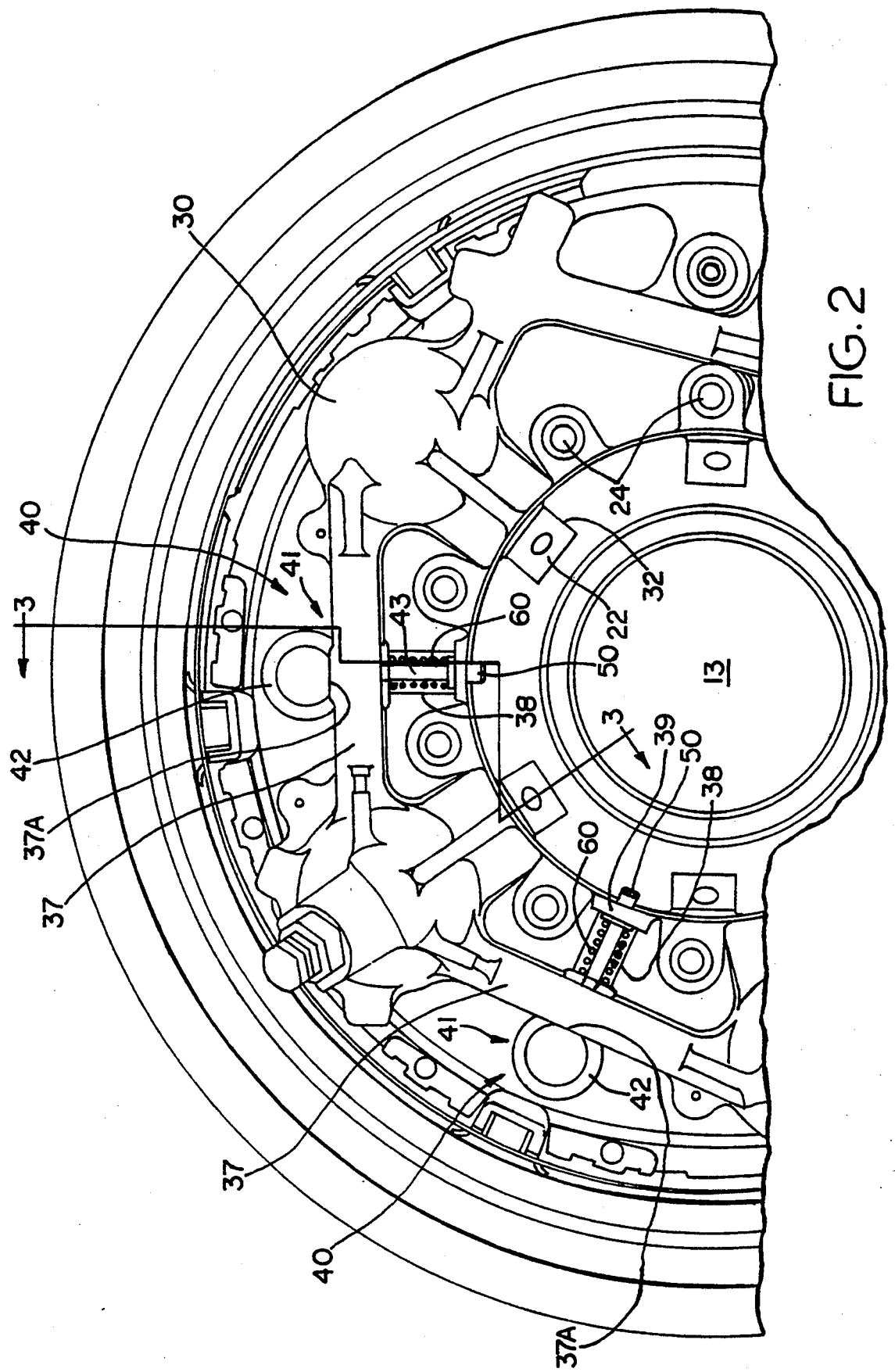
FIG. 2 is an end view of the aircraft brake assembly, wheel and axle of FIG. 1.

FIGS. 2-5 illustrate the aircraft brake assembly retention mechanism designated generally by reference numeral 40. Retention mechanism 40 comprises a retractable mechanism or pin assembly 41 having an enlarged circular head 42 extending into threaded shaft 43 received within threaded opening 53 of end part or nut 50. Piston housing 30 includes stepped radial opening 33 (see FIG. 3) which includes axial opening 38. Piston housing outer and inner bosses 37 and 39 receive shaft 43 and end part 50. Located within radial opening 33 is resilient means or spring 60 of retractable mechanism 41 captured between outer piston housing boss 37 and end part flange 52. Spring 60 and end part 50 may be inserted into opening 33 via axial opening 38 during assembly of retractable mechanism 41. End part 50 includes a hexagonal or other shaped opening 54 for reception of a similarly shaped tool which rotates part 50 so it threads onto threaded shaft 43 during assembly of mechanism 41. End part 50 is in axial abutment with axle flange 13A such that axle flange 13A is trapped axially between end part 50 and torque tube foot 25. As illustrated in FIG. 2, piston housing 30 includes two retention mechanisms 40. Outer piston housing bosses 37 includes surfaces 37A which can be engaged by circular heads 42 when the heads are moved radially outwardly and then turned approximately 90° so that they can engage surfaces 37A and remain in retracted positions whereby end parts 50 are retracted radially and are no longer in axial abutment and engagement with axle flange 13A.

When wheel 12 is removed from the axle, axle nut assembly 18 is disengaged from the axle and then wheel 12 and tapered roller bearing assemblies 14 and 16 may be removed from axle 13. To prevent the brake assembly 10 comprising piston housing 30, torque tube 20, brake discs 34 and 36 from sliding off the axle with the wheel and then possibly falling and causing injury or damage, brake retention mechanisms 40 (see FIG. 2) retain the brake assembly axially in place during the removal of the wheel. Once wheel 12 and associated parts such as heat shield 51 have been removed, the enlarged heads 42 of brake retention mechanisms 40 may be manually pulled radially outwardly and rotated approximately 90° so that bottoms 42A of enlarged circular heads 42 rest on surfaces 37A piston housing bosses 37. This keeps the retention mechanisms in a retracted position with end parts 50 retracted radially so that the end parts no longer abut axle flange 13A. Then the piston housing, torque tube, brake discs and bushing assembly may be removed axially from the axle. When piston housing 30, torque tube 20, bushing assembly 21, and brake discs 34, 36 are repositioned back on the axle (FIG. 1), the brake retention mechanisms are reactivated by turning the enlarged circular heads 42 back to the positions illustrated in FIGS. 2, 3 and 4 so that springs 60 bias end parts 50 downwardly into abutting engagement with axle flange 13A. Thus, axle flange 13A is captured between end parts 50 of retention mechanisms 40 and foot 25 of torque tube 20. The present invention provides a brake assembly retention mechanism that is operated easily and quickly by manual means to enable quick and easy removal of the brake assembly from the axle.

FIG. 4 illustrates an alternative embodiment of the present invention wherein one or each end part 50 may be received within a hole 13B located within the axle flange 13A. The retention mechanism 40 effects an abutting engagement with the axle or a portion thereof in order to retain axially in place brake assembly 10. During operation of the aircraft, the brake assemblies associated with the embodiments of FIGS. 3 and 5 are also retained in place by the bearing means 21 (assemblies 14, 16 and 17), wheel 12, and axle nut assembly 18.

I claim:

1. An aircraft brake assembly retention mechanism for an aircraft, the retention mechanism comprising a piston housing of a brake assembly having a radially extending Opening receiving a retractable mechanism, the retractable mechanism comprising pin means biased by resilient means, the pin means and resilient means located within the radially extending opening, and the pin means extending through said radially extending opening into engagement with a stationary portion of said aircraft, the stationary portion including an abutment surface captured between the retractable mechanism and brake assembly.

2. The retention mechanism in accordance with claim 1, wherein said stationary portion comprises an axle.

3. The retention mechanism in accordance with claim 2, wherein said axle comprises an axle flange with the abutment surface abuttingly engaged by said pin means.

4. The retention mechanism in accordance with claim 3, wherein said piston housing is fixed by means of bolts to a torque tube, the axle flange captured axially between the pin means and torque tube.

5. The retention mechanism in accordance with claim 2, wherein the axle includes a hole which receives said pin means.

6. A brake assembly retention mechanism, comprising an axle which includes an abutment surface, a brake assembly mounted upon the axle and comprising a torque tube connected With a piston housing, at least one stator connected with the torque tube, and at least one rotor for connection with a wheel, and the piston housing including a retractable mechanism extending into abutting engagement with: the abutment surface of the axle in order to retain the brake assembly axially in place upon the axle, the abutment surface of the axle captured axially between the retractable mechanism and torque tube.

7. The brake assembly retention mechanism in accordance with claim 6, wherein the abutment surface comprises a hole.

8. The brake assembly retention mechanism in accordance with claim 7, wherein the retractable mechanism comprises a radially extending pin part which is received within said hole.

9. The brake assembly retention mechanism in accordance with claim 6, wherein the abutment surface; comprises an axle flange and the retractable mechanism extends into abutting engagement with a surface thereof.

10. The brake assembly retention mechanism in accordance with claim 6, wherein the retractable mechanism comprises a pin assembly located at the piston housing and biased by resilient means.

11. The brake assembly retention mechanism in accordance with claim 6, wherein the brake assembly ;comprises at least two retractable mechanisms each abuttingly engaging an abutment surface of the axle.

12. A brake assembly retention mechanism, comprising an axle which includes an abutment surface, a brake assembly mounted upon the axle and comprising a torque tube connected with a piston housing, at least one stator connected with the torque tube, and at least one rotor for connection with a wheel, and the piston housing including a retractable mechanism extending into abutting engagement with the abutment surface of the axle in order to retain the brake assembly axially in place upon the axle, the retractable mechanism comprising a pin assembly located at the piston housing and biased by resilient means, and the pin assembly comprising a threaded shaft received in an end part biased by the resilient means, the pin assembly having an enlarged head to enable retraction of the end part against the biasing force of the resilient means.

13. The brake assembly retention mechanism in accordance with claim 12, wherein the piston housing includes an axial opening so that the resilient means may be inserted axially into the axial opening prior to the shaft being inserted through the resilient means and engaged with the end part.

14. An aircraft brake assembly retention mechanism for an aircraft, the retention mechanism comprising a piston housing of a brake assembly having a radially extending opening receiving a retractable mechanism, said piston housing fixed by means of bolts to a torque tube, the retractable mechanism comprising pin means biased by resilient means, the pin means and resilient means located within the radially extending opening, and the pin means extending through said radially extending opening into engagement with a stationary portion Of said aircraft, said stationary portion comprising an axle which includes an axle flange abuttingly engaged by said pin means, the axle flange captured axially between the pin means and torque tube, and said pin means comprising a head part extending into a threaded shaft received threadly within an end part biased by the resilient means.

15. The retention mechanism in accordance with claim 14, wherein said end part includes an opening for receiving a complementary shaped tool.

16. An aircraft brake assembly retention mechanism for an aircraft, the retention mechanism comprising a piston housing of a brake assembly having a radially extending opening receiving a retractable mechanism, the retractable mechanism comprising pin means biased by resilient means, the pin means and resilient means located within the radially extending opening, and the pin means extending through said radially extending opening into engagement with a stationary portion of said aircraft, the piston housing including an axial opening communicating with said radially extending opening so that the resilient means may be inserted axially into the radially extending opening.

17. An aircraft brake assembly retention mechanism for an aircraft, the retention mechanism comprising a piston housing of a brake assembly having a radially extending opening receiving a retractable mechanism, the retractable mechanism comprising pin means biased by resilient means, the pin means and resilient means located within the radially extending opening, and the pin means extending through said radially extending opening into engagement with a stationary portion of said aircraft, said pin means including an enlarged head part which may be rotated when the pin means is retracted so that the enlarged head part engages a portion of the piston housing and remains in a retracted position.

18. A method of detaching a brake assembly from an axle, the brake assembly comprising a torque tube connected with a piston housing, at least one stator connected with the torque tube, and at least one rotor for connection with a wheel, and the piston housing including a retractable mechanism extending into abutting engagement with an abutment surface of the axle in order to retain the brake assembly axially in place upon the axle, comprising the steps of retracting the retractable mechanism so that the mechanism does not abut the abutment surface, rotating the retractable mechanism when the mechanism is retracted so that the mechanism engages a portion of the brake assembly and remains retracted, and displacing axially the brake assembly from the axle.

* * * * *